US007770966B2

United States Patent
Johnson

(10) Patent No.: US 7,770,966 B2
(45) Date of Patent: Aug. 10, 2010

(54) CONVERTIBLE PASSENGER SEAT ASSEMBLY

(75) Inventor: Glenn A. Johnson, Rural Hall, NC (US)

(73) Assignee: BE Aerospace, Inc., Wellington, FL (US)

( * ) Notice: Subject to any disclaimer, the term of this patent is extended or adjusted under 35 U.S.C. 154(b) by 174 days.

(21) Appl. No.: 12/133,579

(22) Filed: Jun. 5, 2008

(65) Prior Publication Data

US 2009/0121523 A1    May 14, 2009

Related U.S. Application Data

(60) Provisional application No. 60/987,198, filed on Nov. 12, 2007.

(51) Int. Cl.
*A47B 85/04* (2006.01)
*A47C 13/00* (2006.01)

(52) U.S. Cl. .................. 297/122; 297/248; 297/129; 297/217.3

(58) Field of Classification Search .......... 297/248, 297/122, 124, 129, 217.3, 188.1, 188.11
See application file for complete search history.

(56) References Cited

U.S. PATENT DOCUMENTS

| 4,536,027 | A |  | 8/1985 | Brennan |
| 4,881,702 | A |  | 11/1989 | Slettebak |
| 5,104,065 | A |  | 4/1992 | Daharsh et al. |
| 5,131,607 | A |  | 7/1992 | Arnold et al. |
| 5,178,345 | A |  | 1/1993 | Peltola et al. |
| 5,409,186 | A | * | 4/1995 | Chow ..................... 244/122 R |
| 5,516,191 | A |  | 5/1996 | McKee |
| 5,597,139 | A |  | 1/1997 | Beroth |
| 5,848,820 | A | * | 12/1998 | Hecht et al. .............. 297/188.1 |
| 5,966,285 | A | * | 10/1999 | Sellers .................. 361/679.41 |
| 6,082,815 | A | * | 7/2000 | Xiromeritis et al. ......... 297/124 |
| 6,135,549 | A | * | 10/2000 | Demick et al. ........... 297/188.1 |
| 6,389,629 | B1 | * | 5/2002 | Schouest .................... 14/69.5 |
| 6,435,609 | B1 | * | 8/2002 | Gasser .................... 297/188.1 |
| 6,652,024 | B2 | * | 11/2003 | Prasatek .................. 297/188.2 |
| 6,793,282 | B2 | * | 9/2004 | Plant et al. .................. 297/248 |
| 7,143,978 | B2 | * | 12/2006 | Smallhorn ............... 244/118.5 |
| 7,600,811 | B2 | * | 10/2009 | Park et al. .................... 297/144 |
| 2004/0113450 | A1 |  | 6/2004 | Fielding |
| 2005/0184566 | A1 |  | 8/2005 | Baumann et al. |
| 2006/0061122 | A1 |  | 3/2006 | Billger et al. |

\* cited by examiner

*Primary Examiner*—Sarah B McPartlin
(74) *Attorney, Agent, or Firm*—Adams Intellectual Property Law

(57) ABSTRACT

A passenger seat assembly and method for converting the seat assembly between a three-seat configuration and a two-seat configuration includes a seat assembly base and first, second, and third seats mounted on the seat assembly base. The first and third seats define outboard seats and the second seat defines an inboard seat disposed between the outboard seats. The seat back of the inboard seat includes an upper portion movably mounted to the lower portion. The seat bottom is removable and repositionable between the three-seat configuration and the two-seat configuration to form a convenience area between the outboard seats. A power console movably mounted on the seat assembly base supports the seat bottom of the inboard seat and provides at least one power outlet for supplying electrical power. In particular, the inboard seat is convertible between a seating configuration and a non-seating configuration.

11 Claims, 6 Drawing Sheets

CONVERTIBLE PASSENGER SEAT ASSEMBLY

CROSS REFERENCE TO RELATED APPLICATION

This application claims the benefit of priority of U.S. Provisional Application No. 60/987,198, filed on Nov. 12, 2007.

BACKGROUND OF THE INVENTION

This invention relates generally to passenger seating, and more particularly, to a passenger seat for use in a vehicle, such as a commercial aircraft, that is convertible between a three-seat configuration and a two-seat configuration. In particular, the inboard seat of the passenger seat assembly is convertible between a seating configuration and a non-seating configuration.

Changes in the airline industry have made quick turnaround time between flights of increasing importance. Because of financial losses, many airlines have cancelled or delayed new aircraft orders. Existing aircraft must be more quickly turned around between flights. In situations where seat configuration changes are needed, the ability to convert a passenger seat assembly between economy class (also referred to as "coach") configuration and business class configuration saves substantial time over replacement of an entire seat assembly, which generally requires the aircraft to be out of service at least overnight and serviced by an aircraft maintenance crew. At the same time, the increased cost of commercial travel has led aircraft passengers to expect greater comfort and convenience in business class seating.

Conventional aircraft passenger seat assemblies are generally formed of two or more seats attached to a unifying frame which is in turn locked into a seating track in the floor of the aircraft. The seats are usually fixed onto the frame in such as way as to prevent adjustments to the width of the seat itself or to the spacing between adjacent seats of the assembly. U.S. Pat. Nos. 5,178,345, 5,131,607, 5,104,065, and 4,881,702 assigned to The Boeing Company disclose convertible passenger seat assemblies, some of which alter the width and/or spacing of three-seat and two-seat assemblies, and others of which convert seat assemblies between three seats and two seats. U.S. Pat. No. 6,793,282 assigned to B.E. Aerospace, Inc. and U.S. Pat. No. 5,597,139, assigned to Burns Aerospace Corporation also disclose convertible passenger seat assemblies and methods for converting a passenger seat assembly from a three-seat configuration to a two-seat configuration suitable for use in business class seating of a passenger aircraft.

Despite past efforts, a need remains for a convertible passenger seat assembly that is quickly and easily converted between a three-seat configuration (i.e. economy or coach class) and a two-seat configuration (i.e. business class). A more specific need exists for a convertible passenger seat assembly that is quickly and easily converted between a three-seat configuration and a two-seat configuration by the flight crew or ground crew of a commercial aircraft between flights. A further need exists for a convertible passenger seat assembly that improves the comfort and convenience of an aircraft passenger in business class seating.

The convertible passenger seat assembly of the present invention permits quick and easy conversion between a three-seat configuration and a two-seat configuration by an aircraft flight crew or ground crew between flights. More generally, the convertible seat assembly of the present invention permits quick and easy conversion between a seat assembly having any number of seats, wherein at least some of the inboard seats are converted to a buffer between adjacent seats defining a convenience area for use by the occupants of the adjacent seats in business class seating. The seat assembly is designed such that the conversion features and the mechanisms for effecting the conversion are transparent to passengers and intended for access only by an authorized aircraft flight crew or ground crew member.

In addition to providing quick and easy conversion by an aircraft flight crew or ground crew, the convertible passenger seat assembly of the present invention improves the comfort and convenience of conventional business class seating. In particular, the passenger seat assembly provides a convenience area adjacent a business class passenger seat. The passenger seat assembly improves the comfort of a business class passenger by increasing the effective width of the passenger seats adjacent the convenience area. The passenger seat assembly also improves the convenience of a business class passenger seat by providing a magazine stowage compartment having at least one docking station for a communications device, a foldable cocktail table, a placement area for supporting personal articles, an electronics stowage compartment for storing an electronics device, such as a laptop computer, digital video disc (DVD) player, MP3 player or gaming console, and a power console adjacent the business class passenger seat.

BRIEF SUMMARY OF THE INVENTION

The aforementioned objects and advantages, as well as others, are provided by a convertible passenger seat assembly and associated method for converting a passenger seat assembly between a three-seat configuration suitable for economy class seating and a two-seat configuration suitable for business class seating according to the present invention. In one aspect, the invention is embodied by a passenger seat assembly convertible between a three-seat configuration and a two-seat configuration including a seat assembly base and first, second, and third seats mounted on the seat assembly base adjacent one another. Each seat carries a respective seat bottom and a respective seat back. The first and third seats define outboard seats and the second seat defines an inboard seat disposed between the outboard seats. The seat back of the inboard seat defines a lower portion and an upper portion movably mounted to the lower portion. The upper portion being movable relative to the lower portion between the three-seat configuration and the two-seat configuration. The seat bottom of the inboard seat is removable and repositionable on the seat assembly base between the three-seat configuration and the two-seat configuration. The passenger seat assembly further includes a power console movably mounted on the seat assembly base between the three-seat configuration and the two-seat configuration and having at least one power outlet for supplying electrical power to an electronic device.

In another aspect, the power console of the convertible passenger seat assembly defines a support for the seat bottom of the inboard seat in the two-seat configuration. The power console includes a first plate, a second plate pivotally mounted to the first plate and a hinged brace for maintaining the first plate substantially parallel to the second plate in the two-seat configuration. The seat assembly base includes a frame, at least two transversely-spaced support legs, a transverse forward beam extending between the support legs and a transverse aft beam extending between the support legs. The power console is movably mounted to the transverse forward beam for pivotal movement between the three-seat configuration and the two-seat configuration.

In another aspect, the invention is embodied by a passenger seat adapted to be convertible between a seating configuration and a non-seating configuration. The passenger seat includes a seat base, a seat back defining a lower portion and an upper portion movably mounted to the lower portion, the upper portion being movable relative to the lower portion between a raised position and a lowered position, and a seat bottom being removable and repositionable on the seat base between the seating configuration and the non-seating configuration. The passenger seat further includes a power console movably mounted on the seat base between the seating configuration and the non-seating configuration, the power console having at least one power outlet for supplying electrical power to an electronic device. The power console may define a support for the seat bottom in the non-seating configuration. Furthermore, the upper portion of the seat back may define a magazine stowage compartment in the lowered position and may include a foldable cocktail table and at least one docking station for holding a communications device in the non-seating configuration. The power console may further define an electronics stowage compartment disposed between the power console and the seat base for storing an electronics device in the non-seating configuration. The power console may include a first plate, a second plate pivotally mounted to the first plate and a hinged brace for maintaining the first plate substantially parallel to the second plate in the non-seating configuration.

In yet another aspect, the present invention provides a method of converting a passenger seat assembly between an economy class configuration and a business class configuration. The method includes providing a seat assembly base having at least a first, second, and third seat mounted thereon. Each seat carries a respective seat bottom and respective seat back. The first and third seats define outboard seats and the second seat defines an inboard seat disposed between the outboard seats. The method further includes removing the seat bottom of the inboard seat from the seat assembly base. The method further includes moving the power console about the transverse forward beam of the seat assembly base until at least one power outlet is positioned at a forward-facing location. The method further includes rotating and repositioning the seat bottom of the inboard seat such that a forward-facing lip of the seat bottom in the economy class configuration is adjacent the seat back in the business class configuration and the seat bottom is supported by the power console. The method further includes moving an upper portion of the seat back downward relative to a lower portion of the seat back such that the upper portion of the seat back is disposed adjacent the seat bottom in the business class configuration.

BRIEF DESCRIPTION OF THE DRAWINGS

The present invention is best understood by reference to the following detailed description when taken in conjunction with the accompanying drawing figures.

DETAILED DESCRIPTION OF THE INVENTION

Figure 1:
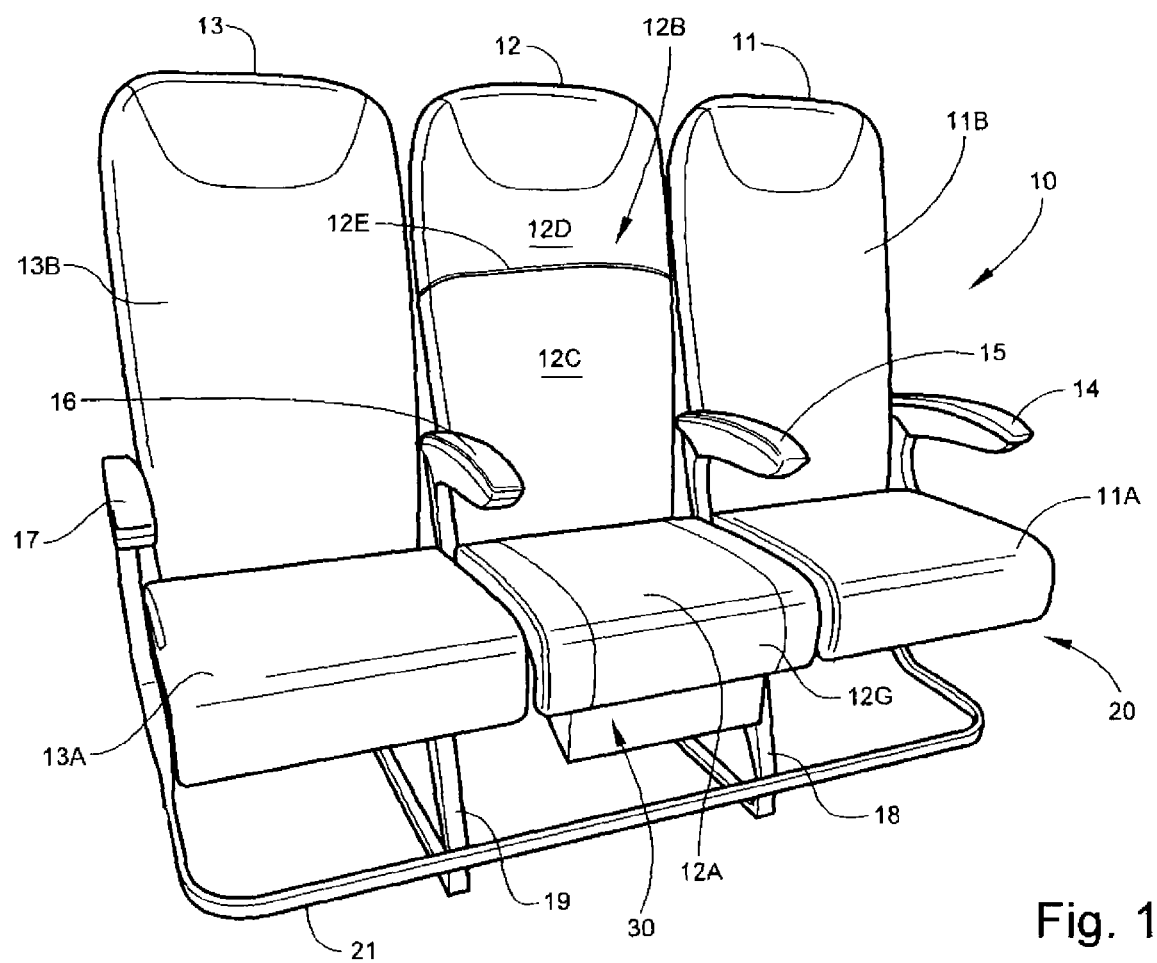
FIG. 1 is a perspective view of a convertible passenger seat assembly constructed in accordance with the present invention and shown in a three-seat configuration.
Figure 2:
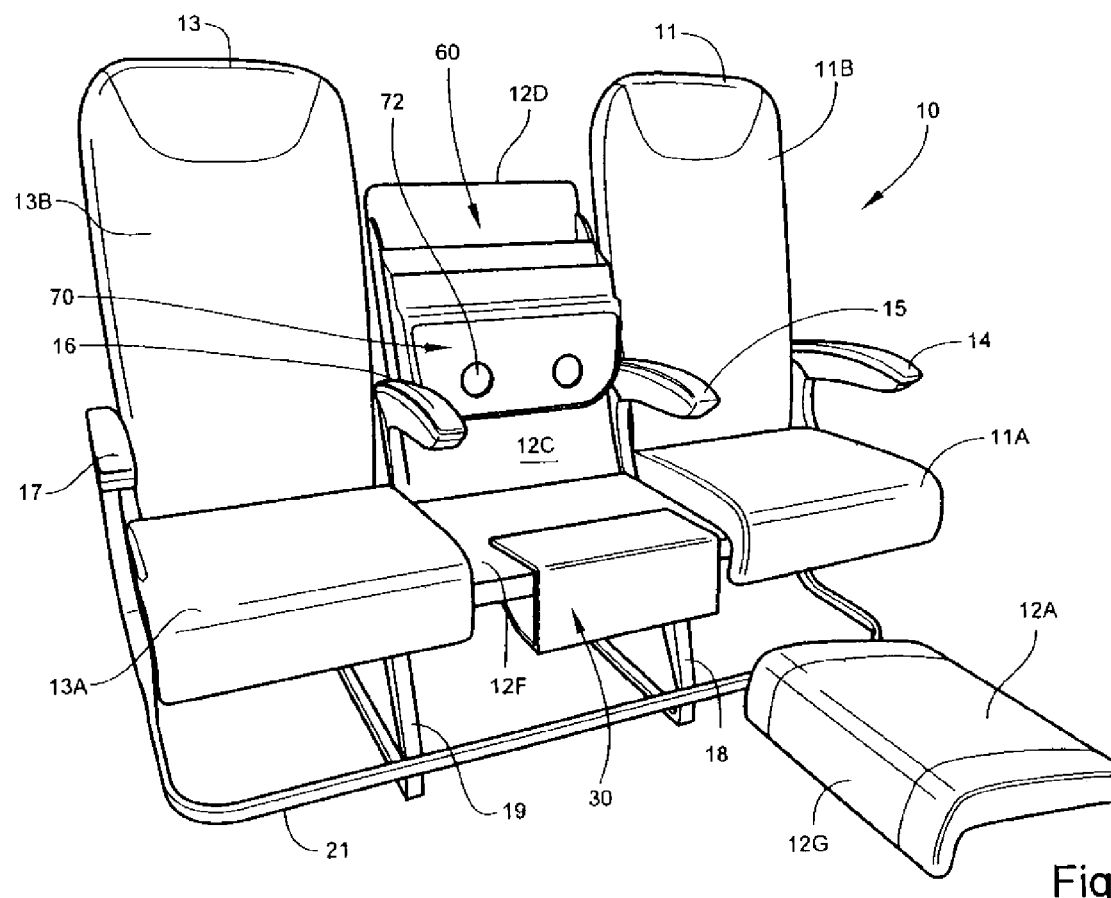
FIG. 2 is a perspective view of the convertible seat assembly of FIG. 1 shown partially converted between a three-seat configuration and a two-seat configuration.

Referring now specifically to the drawings, in which exemplary embodiments of the invention are shown and in which like reference characters represent the same or similar parts in the various view, a convertible passenger seat assembly constructed in accordance with the present invention is indicated generally at 10. The passenger seat assembly 10 is convertible between a three-seat configuration, commonly referred to as "economy class" or "coach class" seating shown in FIG. 1, and a two-seat configuration, commonly referred to as "business class" seating shown in FIG. 3. The passenger seat assembly 10 is shown in FIG. 2 partially converted between the three-seat configuration and the two-seat configuration. More specifically, the convertible passenger seat assembly 10 comprises a seat assembly base 20 and first, second and third passenger seats 11, 12, 13, respectively, mounted on seat assembly base. As shown herein, the first seat 11 of the seat assembly 10 is an outboard window seat, the second seat 12 is an inboard center seat and the third seat 13 is an outboard aisle seat. The passenger seat assembly 10 is configured for use as economy class seating (FIG. 1) on the right-hand side of a conventional commercial aircraft as viewed from a forward portion of the aircraft cabin looking in the aft direction. The passenger seat assembly 10 may be mirrored for use on the left-hand side of the aircraft, or may be configured with any number of seats having at least one inboard seat disposed between adjacent outboard seats for use as economy class seating within a center section of a commercial aircraft. In a preferred embodiment, the passenger seat assembly 10 is symmetric about the center of the inboard seat 12 so as to be useable on both the right-hand side and the left-hand side of an aircraft without modification.

Figure 3:
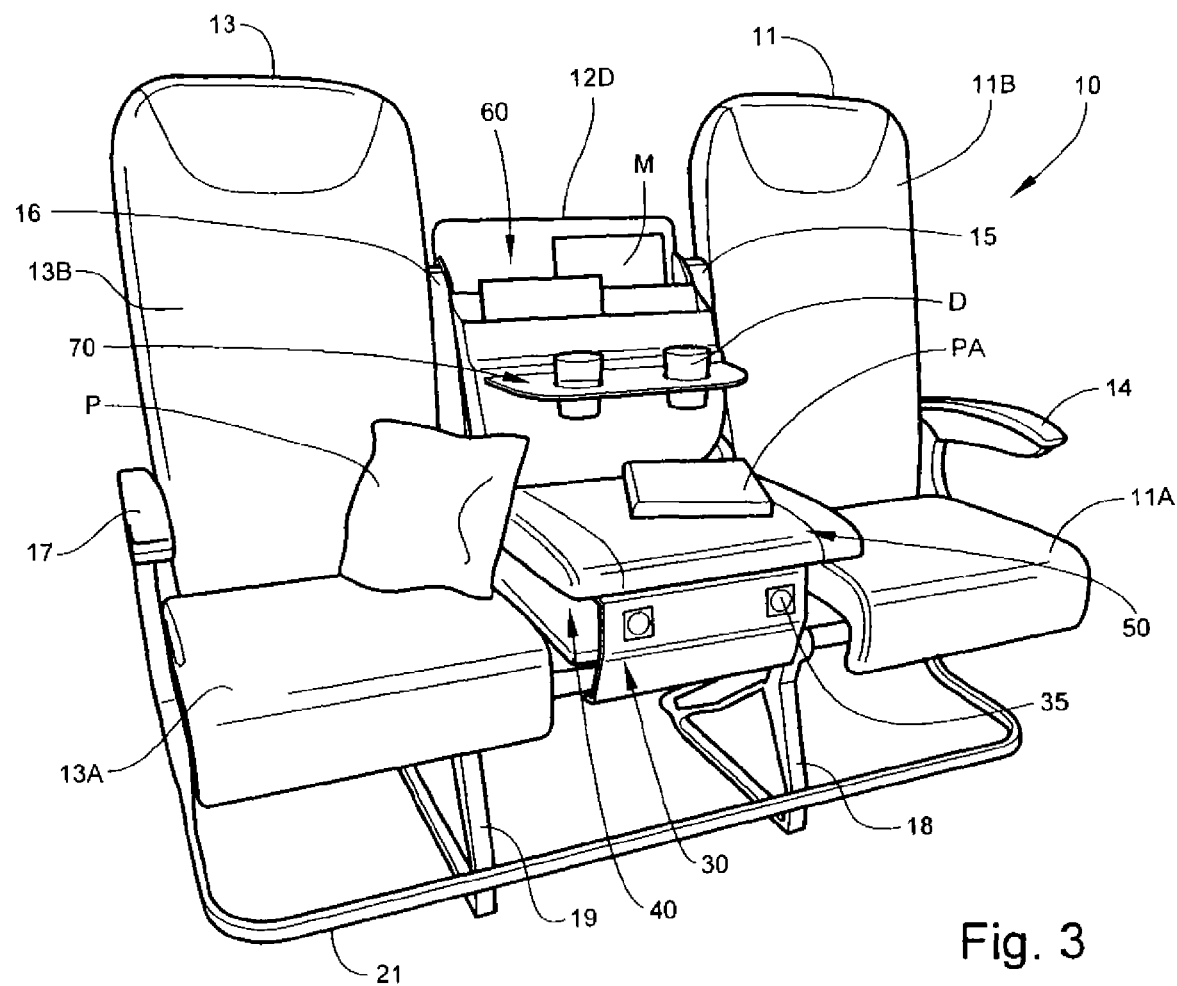
FIG. 3 is a perspective view of the convertible passenger seat assembly of FIG. 1 shown fully converted from the three-seat configuration to the two-seat configuration.

The passenger seat assembly 10 comprises four armrests 14, 15, 16 and 17. Armrests 14 and 15 are disposed on opposite sides of outboard (window) seat 11. Similarly, armrests 16 and 17 are disposed on opposite sides of outboard (aisle) seat 13. As a result, the inboard (center) seat 12 shares armrest 15 with the outboard seat 11 and shares armrest 16 with outboard seat 13. The armrests 14, 15, 16 and 17 may be adjustable in any desired manner, for example forward and aft or up and down. Regardless, at least armrests 15 and 16 are movable between an extended use position and a retracted storage or stowage position. The extended use position is best illustrated in FIG. 1 and the retracted stowage position is best illustrated in FIG. 3.

As shown, the seat assembly base 20 of the passenger seat assembly 10 comprises a pair of transversely spaced apart support legs 18, 19 and a frame 21 mounted on the support legs. Preferably, the leg 18 is disposed between the inboard seat 12 and the adjacent outboard seat 11, while the other leg 19 is disposed between the inboard seat 12 and the adjacent outboard seat 13. The legs 18, 19 in turn are locked into mounting tracks (not shown) provided in the floor of the aircraft cabin interior. A forward beam 22 (see FIG. 4) extends transversely through openings formed in a forward portion of the support legs 18, 19, and an aft beam 23 (see FIG. 4) extends through openings formed in an aft portion of the support legs. The passenger seats 11, 12, 13 are mounted to the frame 21 and supported on the transverse forward beam 22 and the transverse aft beam 23. The beams 22, 23 in turn are supported on the legs 18, 19 that are secured to the mounting tracks of the aircraft cabin interior in a conventional manner.

Each seat 11, 12, 13 carries a respective seat bottom 11A, 12A, 13A and respective seat back 11B, 12B, 13B. In particular, first (outboard) seat 11 comprises seat bottom 11A and seat back 11B. Similarly, third (outboard) seat 13 comprises seat bottom 13A and seat back 13B. Second (inboard) seat 12 comprises seat bottom 12A and seat back 12B. As shown, seat back 12B further comprises a lower portion 12C and an upper portion 12D movably mounted to the lower portion. Preferably, the upper portion 12D is pivotally mounted to lower portion 12C, for example by a piano hinge, living hinge, rotatable shaft or tube, or similar mechanism 12E, such that the upper portion is rotatable relative to the lower portion between the three-seat configuration and the two-seat configuration. In the three-seat configuration, the upper portion 12D is positioned generally parallel to and extending upwardly from the lower portion 12C. In the two-seat configuration, the upper portion 12D is positioned generally parallel to and adjacent the lower portion 12C in the forward direction for a purpose to be described hereinafter. If desired, any or all of the seats 11, 12, 13 may further comprise a headrest (not shown) that operates in a conventional manner to provide additional support and comfort for the head of a passenger.

Finally, the passenger seat assembly 10 comprises a power console 30 disposed on the seat assembly base 20. More particularly, the power console 30 is disposed on the transverse forward beam 22 medially between the outboard seat 11 and the outboard seat 13 beneath the seat bottom 12A of the inboard seat 12. As will be described in greater detail hereinafter, the power console 30 is movably mounted on the transverse forward beam 22 between a stowed position shown in FIG. 1 and FIG. 2 and a deployed position shown in FIG. 3. The power console 30 is in the stowed position when the passenger seat assembly 10 is in the three-seat configuration for economy class seating. Conversely, the power console 30 is in the deployed position when the passenger seat assembly 10 is in the two-seat configuration for business class seating. In the deployed position, the power console 30 comprises at least one power outlet 35 for supplying electrical power to an electronic device, such as a laptop computer, digital video disc (DVD) player, MP3 player or gaming console. The power console 30 also defines an electronics stowage compartment 40 within a space formed between the power console and a seat shell 12F (see FIG. 6) of the inboard seat 12 in the deployed position. The electronics stowage compartment 40 may be used by a passenger seated in an adjacent outboard seat 11, 13 to store an electronics device or other personal article PA, such as a book, newspaper, documents, food items, etc. belonging to the passenger.

The manner or method for converting the passenger seat assembly 10 between the three-seat configuration for economy class seating and the two-seat configuration for business class seating will now be described with reference to FIGS. 4, 5 and 6. Ordinarily, the conversion would be accomplished by flight crew or ground crew personnel during ground servicing of the aircraft between flights. The number and location of the passenger seat assemblies 10 converted between the three-seat configuration and the two-seat configuration would be based on the passenger mix anticipated for an upcoming flight as determined by passenger reservations for the different classes of seating (i.e. economy class and business class). If a particular flight requires additional business class seating, the armrests 15 and 16 are raised from the extended use position to the retracted stowage position, as depicted by the solid-line counterclockwise arrow adjacent the armrest 16 in FIG. 5. Next, the seat bottom 12A is removed from the inboard seat 12 by lifting the seat bottom upwardly and outwardly (forwardly) from the seat shell 12F, as depicted by the solid-line straight arrow in FIG. 5.

Figure 4:
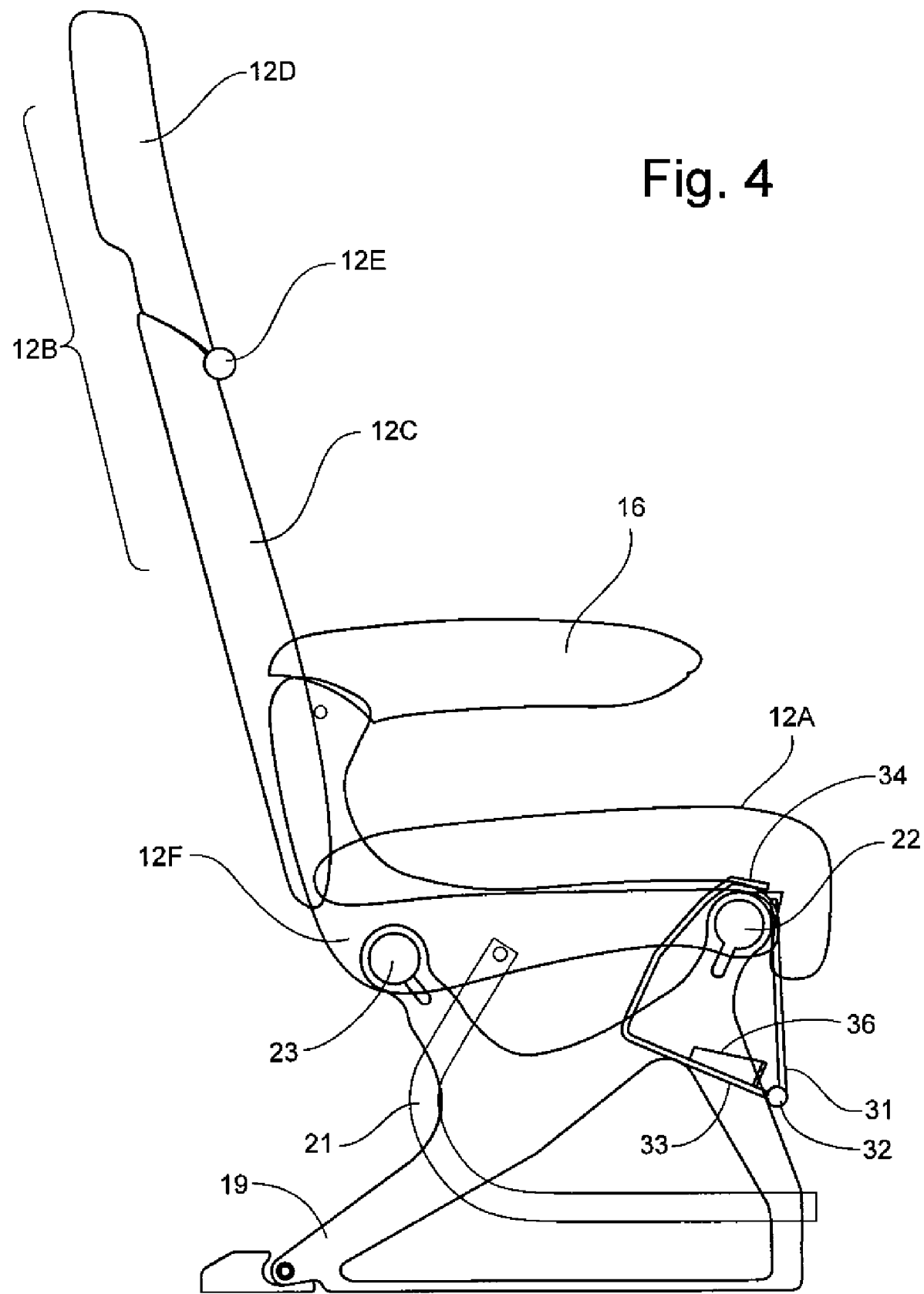
FIG. 4 is a side elevation view of the inboard seat of the convertible passenger seat assembly of FIG. 1 shown in the three-seat configuration depicted in FIG. 1.
Figure 5:
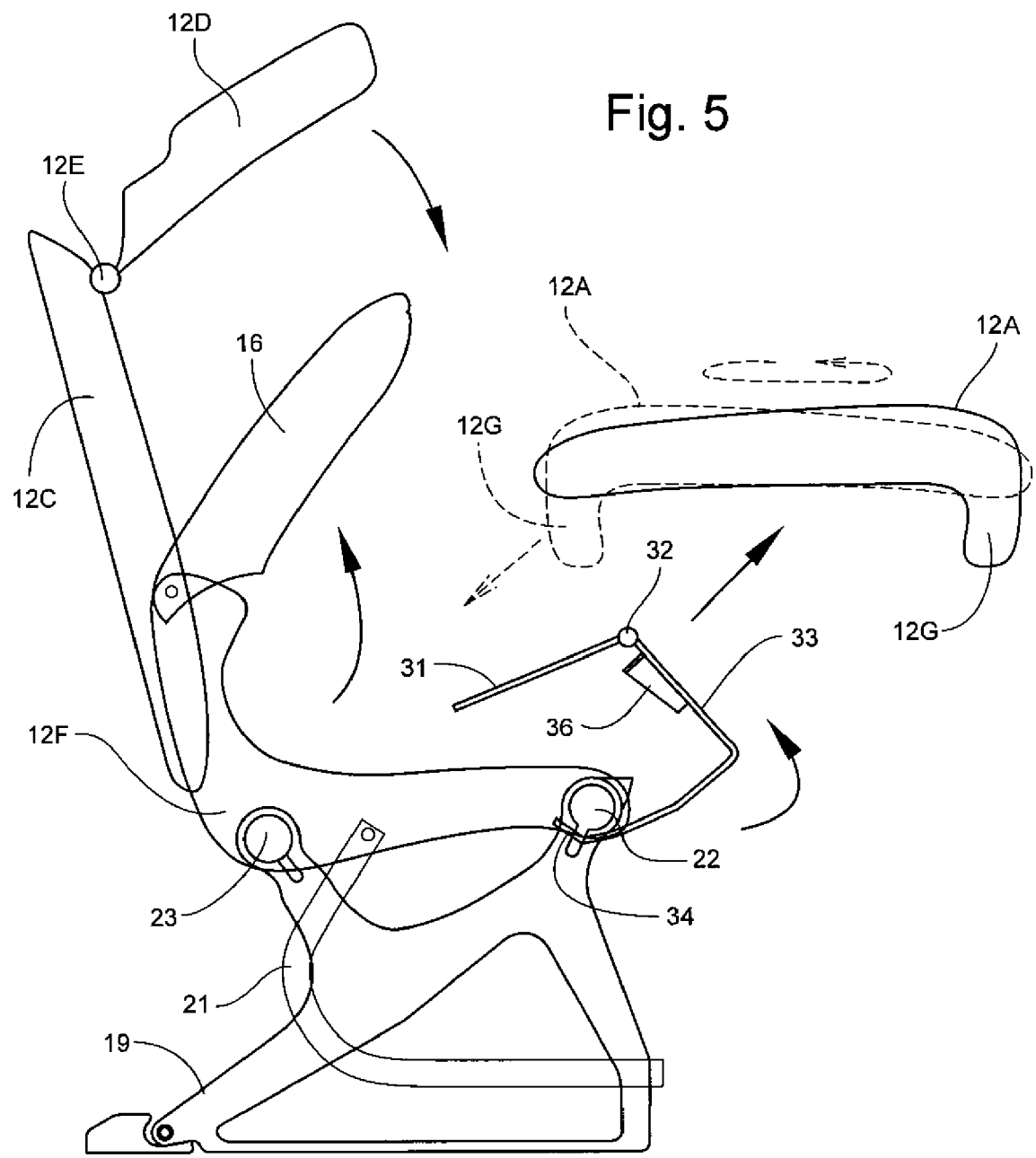
FIG. 5 is a side elevation view of the inboard seat of the convertible passenger seat assembly of FIG. 1 shown in the partially converted configuration depicted in FIG. 2.
Figure 6:
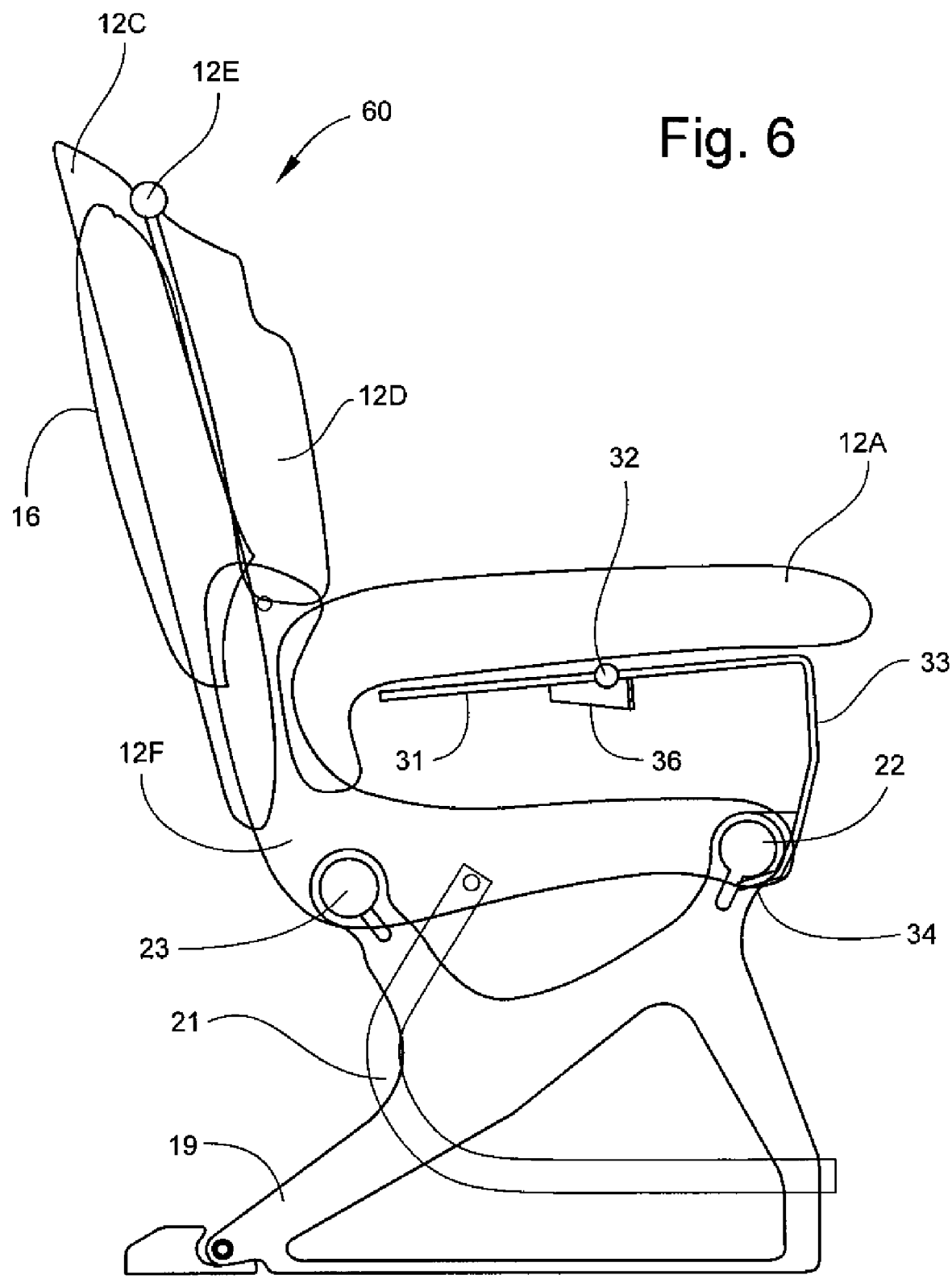
FIG. 6 is a side elevation view of the inboard seat of the convertible passenger seat assembly of FIG. 1 shown in the fully converted configuration depicted in FIG. 3.

With the seat bottom 12A removed, the power console 30 is moved from the stowed position shown in FIG. 4 to the deployed position shown in FIG. 6, as depicted by the solid-line counterclockwise arrow adjacent the power console in FIG. 5. In the exemplary embodiment shown herein, the power console 30 comprises a first plate 31 and a second plate 33 pivotally attached to the first plate by a pivot 32. The pivot 32 may be a piano hinge, living hinge, rotatable shaft or tube, or any similar suitable mechanism such that the first plate 31 and the second plate 33 are rotatable relative to one another between the stowed position and the deployed position. The second plate 33 has a series of bends in a direction away from the first plate 31 such that the power console 30 unfolds from a closed generally box-like configuration in the stowed position to an open generally L-shaped configuration in the deployed position. In the exemplary embodiment shown herein, the second plate 33 has a series of 3 bends and the free end 34 of the second plate is pivotally affixed to the transverse forward beam 22 of the seat assembly base 20. As a result, the power console 30 unfolds from the stowed position to the generally L-shaped configuration (FIG. 6) in the deployed position having a generally vertical portion extending upwardly from the transverse forward beam 22 and a planar generally horizontal portion depending in the aft direction (rearwardly) from the vertical portion.

The vertical portion of the power console 30 functions to present the at least one power outlet 35 in a forward-facing orientation for access by a passenger seated in an adjacent outboard seat 11, 13. If desired, a newspaper clip or similar retaining device may be provided on the vertical portion of the power console 30 adjacent the at least one power outlet 35. For example, the newspaper clip may extend from the outer surface of a bend section of the second plate 33 so as to be accessible for use by a passenger seated in an adjacent outboard seat 11, 13. The horizontal portion of the power console 30 functions to provide a support surface for receiving the seat bottom 12A of the inboard seat 12, as will be described, and to define the electronic stowage compartment 40. The pivot 32 may include a mechanical stop for maintaining the first plate 31 and the second plate 33 in the deployed position. However, as shown herein, the power console 30 comprises an optional hinged brace 36 for maintaining the first plate 31 substantially parallel to the second plate 33 in the deployed position for forming the passenger seat assembly 10 in the two-seat configuration. The hinged brace 36 may comprise a pair of arms pivotally connected by a hinge, or alternatively, may comprise a single arm pivotally mounted on a pin or post. Regardless, the hinged brace 36 is movable between a first orientation wherein the entire movable brace underlies the second plate 33 in the stowed position to a second orientation wherein a portion of the movable brace underlies the second plate and a portion of the movable brace underlies the first plate 31 to lock the power console in the deployed position.

The seat bottom 12A is then rotated 180 degrees about the vertical such that the lip 12G of the seat bottom is oriented in the aft direction, as depicted by the dashed-line circular arrow in FIG. 5. It should be apparent that the seat bottom 12A may be rotated in either the counterclockwise (as shown) direction or the clockwise direction about the vertical until the lip 12G is oriented in the aft direction, as depicted by the dashed lines. The seat bottom 12A is then repositioned on the seat shell 12F with the lip 12G positioned adjacent the lower portion 12C of the seat back 12B, as depicted by the dashed-line straight arrow in FIG. 5, and as shown in FIG. 6. In this position, the seat bottom 12A is supported by the horizontal portion of the power console 30 (namely first plate 31 and the second plate 33) with the power console in the deployed position. As such, the seat bottom 12A functions to provide a comfortable, padded placement area 50 for supporting a personal article PA, such as a book, documents, food items, etc., belonging to a passenger seated in an adjacent outboard seat 11, 13. With the armrests 15, 16 in the retracted stowage position and the passenger seat assembly 10 in the two-seat configuration, the effective width of the adjacent outboard seats 11, 13 is increased, thereby improving the comfort of a passenger in business class seating and providing additional room in the lateral direction of the outboard seats for a padded support or pillow P to be utilized in a leaning or partially-turned sleeping or reclining posture. In addition, the lateral outer edges of the placement area 50 defined by the padded seat bottom 12A provide a comfortable armrest for a passenger seated in an adjacent outboard seat 11, 13.

Finally, the upper portion 12D of the seat back 12B may be lowered (i.e. rotated about mechanism 12E) relative to the lower portion 12C of the seat back to the orientation shown in FIG. 6, as depicted by the solid-line clockwise arrow in FIG. 5. In the raised orientation, the upper portion 12D functions as a part of the seat back 12B of the inboard seat 12 in the three-seat configuration for economy class seating. In the lowered orientation, the upper portion 12D of the seat back 12B functions as a magazine stowage compartment 60 for storing relatively thin items M, such as magazines, newspapers, documents, compact discs, DVDs, video game discs, etc. As shown, the magazine stowage compartment 60 comprises a tiered forward slot and rear slot extending laterally across substantially the entire width of the seat back 12B. However, the magazine stowage compartment 60 may be arranged in any desired configuration suitable for storing items M in a convenient, readily accessible, yet secure manner. The magazine stowage compartment 60 may also comprise at least one docking station (not shown) for receiving and securely storing a communications device, such as a mobile or cellular phone (e.g. iPhone), personal digital assistant (PDA) or compact audio player (e.g. MP3). The size (i.e. height) of the upper portion 12D is selected such that the upper portion 12D does not interfere with the seat bottom 12A in the two-seat configuration. Likewise, the location of the mechanism 12E is selected such that it is positioned at substantially the same height above the seat bottom 12A as the forward ends of the arm rests 15, 16 so as to create a clean line laterally across the width of the inboard seat 12.

As shown, a cocktail table 70 is affixed to the upper portion 12D of the seat back 12B. The cocktail table 70 preferably has at least one hole or opening 72 formed therethrough for receiving a drink container D, such as a cup, glass, can, etc. Furthermore, the cocktail table 70 is preferably pivotally mounted to the upper portion 12D of the seat back 12B so as to be movable (i.e. flip-down/flip-up) between a stowed position and a deployed position in a conventional manner. It should be noted that the cocktail table 70 may be useable in an inverted orientation by a passenger seated in the center (inboard) seat of an aft passenger seat assembly when both seat assemblies are arranged in the three-seat configuration for economy class seating. Optional convenience lighting (e.g. LED) may also be provided on the magazine stowage compartment 60 and/or cocktail table 70 for a passenger seated in an adjacent outboard seat 11, 13 to improve reading and working efficiency when there is insufficient lighting within the aircraft cabin.

A convertible passenger seat assembly and method for converting a passenger seat assembly between a three-seat configuration suitable for economy class seating and a two-seat configuration suitable for business class seating are shown in the accompanying drawings and described above. Various details of the convertible passenger seat assembly may be changed, altered, revised or rearranged without departing from the spirit and intended broad and general scope of the invention. Furthermore, the foregoing description of exemplary or preferred embodiments of the invention and the best mode for making, using and practicing the invention are provided for the purpose of illustration only and not for the purpose of limitation. Instead, the scope of the invention is defined by the appended claims.

That which is claimed is:

1. A passenger seat assembly convertible between a three-seat configuration and a two-seat configuration, the passenger seat assembly comprising:
   (a) a seat assembly base;
   (b) first, second, and third seats mounted on the seat assembly base adjacent one another, each seat carrying a respective seat bottom and a respective seat back, the first and third seats defining outboard seats and the second seat defining an inboard seat disposed between the outboard seats, the seat back of the inboard seat defining a lower portion and an upper portion movably mounted to the lower portion, the upper portion being movable relative to the lower portion between two positions corresponding respectively to the three-seat configuration and the two-seat configuration, the seat bottom of the inboard seat being removable and repositionable on the seat assembly base between two positions corresponding respectively to the three-seat configuration and the two-seat configuration; and
   (c) a power console movably mounted on the seat assembly base between two positions corresponding respectively to the three-seat configuration and the two-seat configuration, the power console having at least one power outlet for supplying electrical power to an electronic device,
   (d) wherein the power console comprises a first plate, a second plate pivotally mounted to the first plate and a hinged brace for maintaining the first plate substantially parallel to the second plate when in the two-seat configuration.

2. A passenger seat assembly according to claim 1, wherein the power console defines a support for the seat bottom of the inboard seat in the two-seat configuration.

3. A passenger seat assembly according to claim 1, wherein the upper portion of the seat back of the inboard seat is rotatable between a raised position in lateral alignment with the seat backs of the adjacent outboard seats in the three-seat configuration and a lowered position in the two-seat configuration.

4. A passenger seat assembly according to claim 3, wherein the upper portion of the seat back of the inboard seat defines a magazine stowage compartment in the lowered position and comprises a foldable cocktail table and at least one docking station for holding a communications device in the two-seat configuration.

5. A passenger seat assembly according to claim 1, wherein the power console defines an electronics stowage compartment disposed between the power console and the seat assembly base for storing an electronics device in the two-seat configuration.

6. A passenger seat assembly according to claim 1, wherein the effective width of each of the adjacent outboard seats is increased when first and second armrests provided on opposite sides of the inboard seat are in a retracted position and the passenger seat assembly is in the two-seat configuration.

7. A passenger seat assembly according to claim 1, wherein the seat assembly base comprises a frame, at least two transversely-spaced support legs, a transverse forward beam extending between the support legs and a transverse aft beam extending between the support legs, and wherein the power console is movably mounted to the transverse forward beam.

8. A passenger seat adapted to be convertible between a seating configuration and a non-seating configuration, comprising:
  (a) a seat base;
  (b) a seat back defining a lower portion and an upper portion movably mounted to the lower portion, the upper portion being movable relative to the lower portion between a raised position and a lowered position;
  (c) a seat bottom being removable and repositionable on the seat base between two positions corresponding respectively to the seating configuration and the non-seating configuration; and
  (d) a power console movably mounted on the seat base between two positions corresponding respectively to the seating configuration and the non-seating configuration, the power console having at least one power outlet for supplying electrical power to an electronic device,
  (e) wherein the power console comprises a first plate, a second plate pivotally mounted to the first plate and a hinged brace for maintaining the first plate substantially parallel to the second plate when in the non-seating configuration.

9. A passenger seat according to claim 8, wherein the power console defines a support for the seat bottom in the non-seating configuration.

10. A passenger seat according to claim 8, wherein the upper portion of the seat back defines a magazine stowage compartment in the lowered position and comprises a foldable cocktail table and at least one docking station for holding a communications device in the non-seating configuration.

11. A passenger seat according to claim 8, wherein the power console defines an electronics stowage compartment disposed between the power console and the seat base for storing an electronics device in the non-seating configuration.

* * * * *